United States Patent [19]

Ha

[11] Patent Number: 5,233,593
[45] Date of Patent: Aug. 3, 1993

[54] METHOD OF HIGH SPEED SEARCHING FOR A DESIRED TAPE PORTION IN A DIGITAL AUDIO TAPE RECORDER

[75] Inventor: Tae-Yong Ha, Seoul, Rep. of Korea

[73] Assignee: SamSung Electronics Co., Ltd., Suwon, Rep. of Korea

[21] Appl. No.: 511,779

[22] Filed: Apr. 20, 1990

[30] Foreign Application Priority Data

Apr. 22, 1989 [KR] Rep. of Korea ............ 1989-5319[U]

[51] Int. Cl.⁵ .............................................. H04N 5/76
[52] U.S. Cl. ......................................... 369/60; 369/59
[58] Field of Search ............... 369/44.33, 47, 53, 54, 369/59, 60, 58; 365/195

[56] References Cited

U.S. PATENT DOCUMENTS

| | | | |
|---|---|---|---|
| 4,631,706 | 12/1986 | Batalden et al. | 365/195 |
| 4,680,594 | 7/1987 | Bracht | 369/54 |
| 4,831,611 | 5/1989 | Sasaki et al. | 369/54 |
| 5,060,218 | 10/1991 | Chiyomatsu | 369/58 |

*Primary Examiner*—Aristotelis Psitos
*Assistant Examiner*—Won Tae C. Kim
*Attorney, Agent, or Firm*—Robert E. Bushnell, Esq.

[57] ABSTRACT

There is disclosed a circuit for inhibiting overwriting used in a WORM (Write Once Read Many) type optical disk driver. The circuit analyzes the signal read from the disk just before the write data is emitted from the WORM type optical disk driver, to produce an overwrite error signal when the pitted portion storing data is overwritten, so that the system control interrupts the writing operation according to the error signals, thus preventing data destruction.

6 Claims, 4 Drawing Sheets

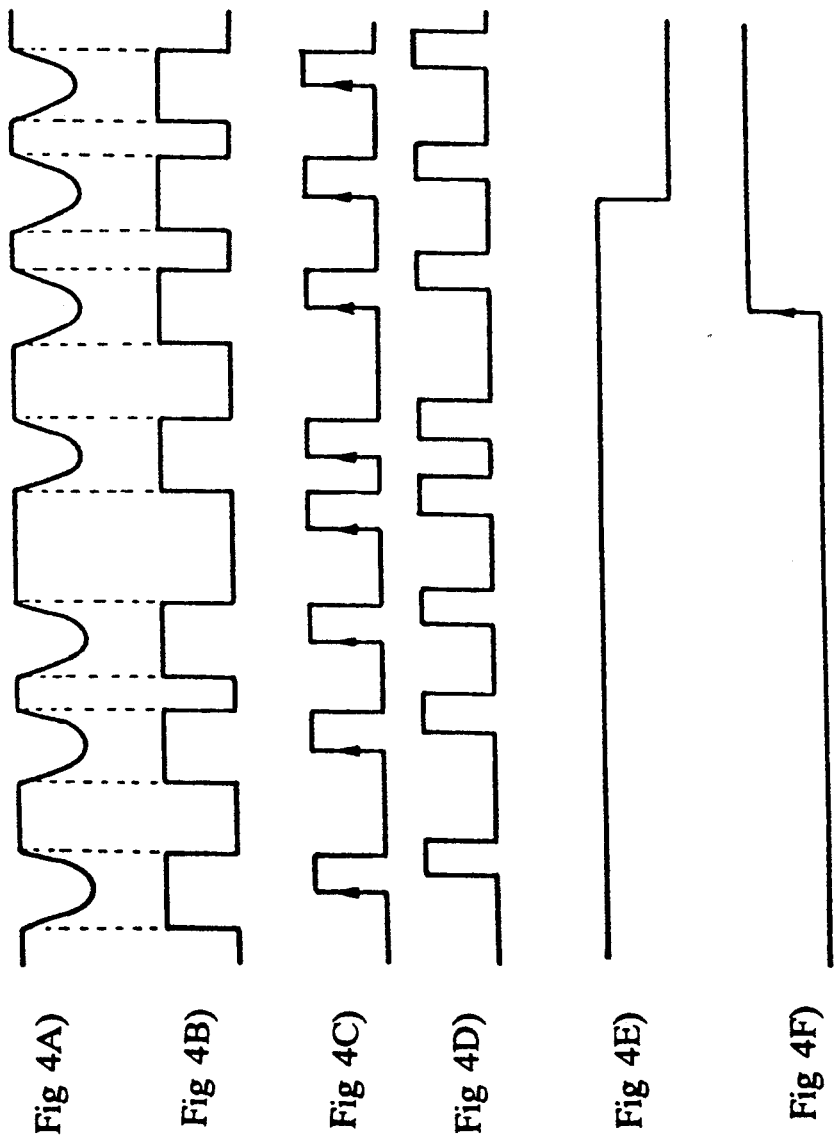

5,233,593

METHOD OF HIGH SPEED SEARCHING FOR A DESIRED TAPE PORTION IN A DIGITAL AUDIO TAPE RECORDER

BACKGROUND OF THE INVENTION

The present invention concerns a WORM (Write Once Read Many) type optical disk driver, particularly a circuit for inhibiting overwriting of data on the recording regions of a disk.

Generally, the data once written on a WORM type optical disk should not be erased or destroyed under any circumstances, so that it can be almost permanently retrieved. On the WORM type disk is formed spirally or concentrically a track, which is pitted by using a laser to write desired data. In retrieving the data, a laser beam tracks precisely the pits formed on the disk. The laser beam for writing has much higher power than the laser beam for reading.

Conventionally, when tracking the disk many factors including, circuit unstability of the WORM type optical disk driver, external impacts, flaws on the disk, dusts, etc., may cause the write laser beam to be emitted upon the track portions previously storing data, thus destroying the previously stored data.

SUMMARY OF THE INVENTION

The object of the present invention is therefore to provide a circuit for inhibiting overwriting on portions of a track previously storing data, which is used in a WORM type optical disk driver.

According to the present invention, the circuit for inhibiting overwriting includes:

a laser producing device for producing a data read beam in playing mode and a data write beam of a second write pulse;

a data reading device for reading the data stored on an optical disk to produce analog read signals;

a delay circuit for delaying a first write pulse produced from a system control so as to produce the second write pulse for writing data into the disk;

an analog/digital converter for converting the analog read signals into digital signals;

a time interval establishing means for receiving the first write pulse to establish a time window for detecting overwrite error signals during a given period; and a counter for counting the number of times when the output of said analog/digital converter represent data previously stored at the time of generating the first write pulse within the time window to produce an overwrite control signal when the counted value exceeds a given number.

BRIEF DESCRIPTION OF THE DRAWINGS

For a better understanding of the invention and to show how the same may be carried into effect, reference will now be made, by way of example, to the accompanying diagrammatic drawings, in which:

FIGS. 1A–1E shows graphs for illustrating the concept of inhibiting overwriting according to the present invention;

FIGS. 4A–4F shows the operational waveforms of FIG. 3.

DETAILED DESCRIPTION OF THE PREFERRED EMBODIMENT

Hereinafter, the present invention will now be described more specifically with reference to the drawings attached only by way of example.

Referring to FIG. 1, 1A shows a cross section of a disk track, 1B the waveform of the read signal through the disk track, 1C the digitally converted signal of 1B, 1D a first write pulse $d_1$ (modulated write pulse) and second write pulse $d_2$ obtained by delaying the first write pulse by a certain time, and 1E the overwrite error signal produced when the first write pulse 1D is emitted upon the disk track 1A already storing data. When the read signal is detected to represent a pitted portion on the disk at the generation of the first write pulse, an overwrite control signal is produced.

Figure 2:
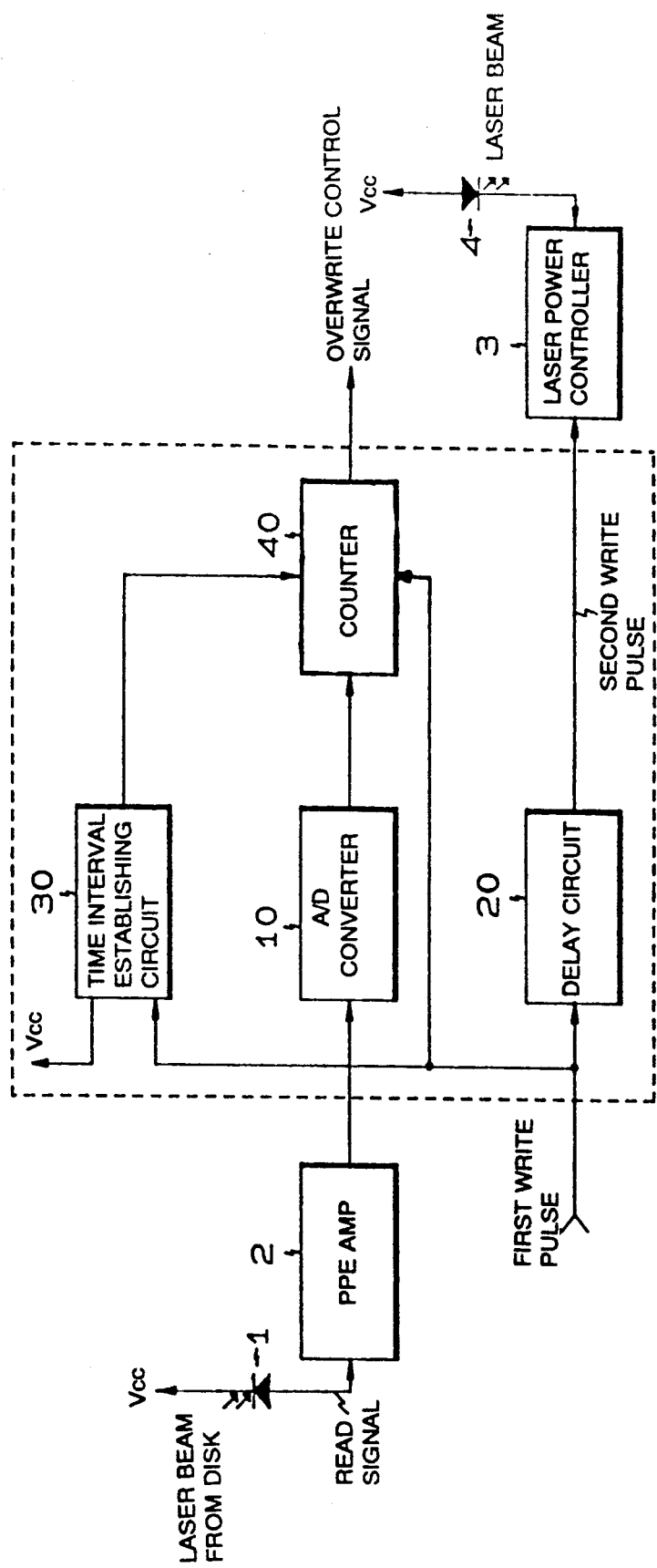
FIG. 2 is a block diagram of the inventive circuit.
Figure 2:
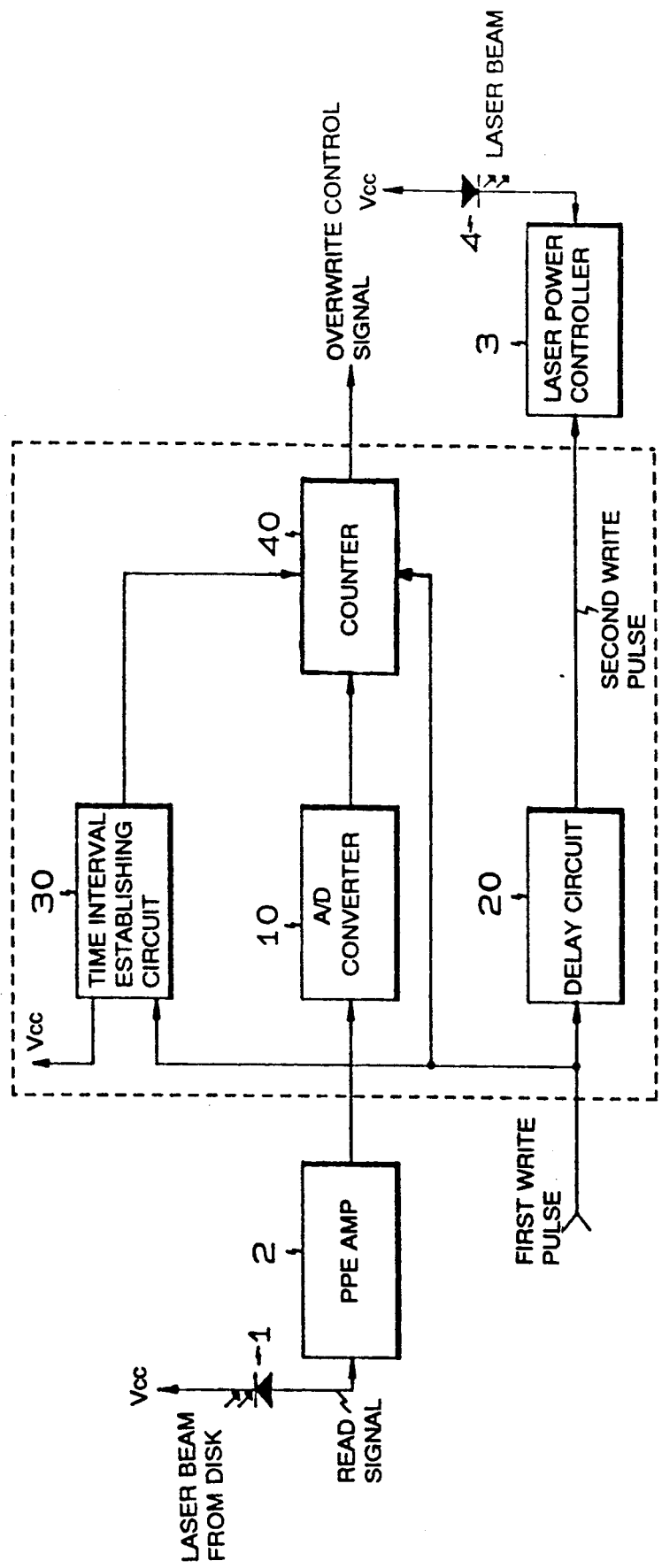

Referring to FIG. 2, photo detector 1 and pre-amplifier (pre-Amp) 2 consititute data read means for photo-electrically detecting, converting and amplifying the data stored on the disk to produce analog read signals. Laser power controller 3 and laser diode 4 constitute laser producing means for producing a data write beam of a second write pulse in a writing mode and a data read beam in a playing mode. Analog/digital converter 10 converts the analog read signals into digital signals. Delay circuit 20 delays a first write pulse by a certain time so as to produce the second write pulse for writing data into the disk. Time interval establishing circuit 30 receives the first write pulse to establish a time window for detecting overwrite error signals during a given period. Counter 40 is enabled when a number of predetermined overwrite errors signals occur within the time window.

Referring to FIGS. 1 and 2, FIG. 1A is a cross section of a disk, wherein $a_1$ indicates the protective layer, and $a_2$ pits wherein data is written by the write laser beam. The read laser beam irradiated upon the disk is reflected from the disk and received by the photo detector 1, FIG. 2, to be converted into an electrical signal. The read laser beam has lower power than the write laser beam.

The read signal, electrically converted through the photo detector 1, is as shown by FIG. 1B, when the pits $a_2$ reflect less light, so that the low state signal is produced in the data recorded regions. The read signal as shown in FIG. 1B is amplified by the pre-amplifier 2 and is converted into a digital signal as shown in FIG. 1C by the analog/digital converter 10.

In order to write data on the disk and retrieve the data written on the disk, the laser power controller 3 emits the write and read laser signals through the laser diode 4, wherein the second write pulse as indicated by $d_2$ is employed for writing data. The first write pulse (modulated write pulse) as indicated by $d_1$ is delayed by the delay circuit 20 to produce the second write pulse $d_2$ applied to the laser power controller 3. The second write pulse is to emit the write laser beam. The first write pulse is employed to inhibit overwriting data on the portions of the disk already storing data. Just before the write laser beam is emitted, the output of the analog/digital converter 10 is analyzed by using the first write pulse as indicated by $d_1$. If data recording signal is produced from the disk, it represents the write laser is applied to a pitted track, so that an overwrite error signal is produced. Then, if the output of the analog/digital converter 10 is logic high state as shown in FIG. 1C at the rising edge of the first write pulse as indicated by $d_1$, it is counted by the counter 40 as an overwriting signal. Hence, the counter 40 counts the overwriting error signals according to the output of the time interval establishing circuit 30 which produces a time window signal for causing the counter to count during a specified time from the beginning of the first write pulse. If overwriting error signals are successively produced, an overwriting control signal is applied to the system controller for controlling the overwriting error signals.

The reason that the counter 40 produces the overwriting control signal only when they are successively produced during several bits from the beginning of the first write pulse is to avoid the interruption of writing which may be caused by dusts, flaws or a little unstability of the disk to produce only one bit of the error signal. On the other hand, if too many overwriting error signals are bypassed, many portions of the disk may be destroyed by the overwriting.

Figure 3:
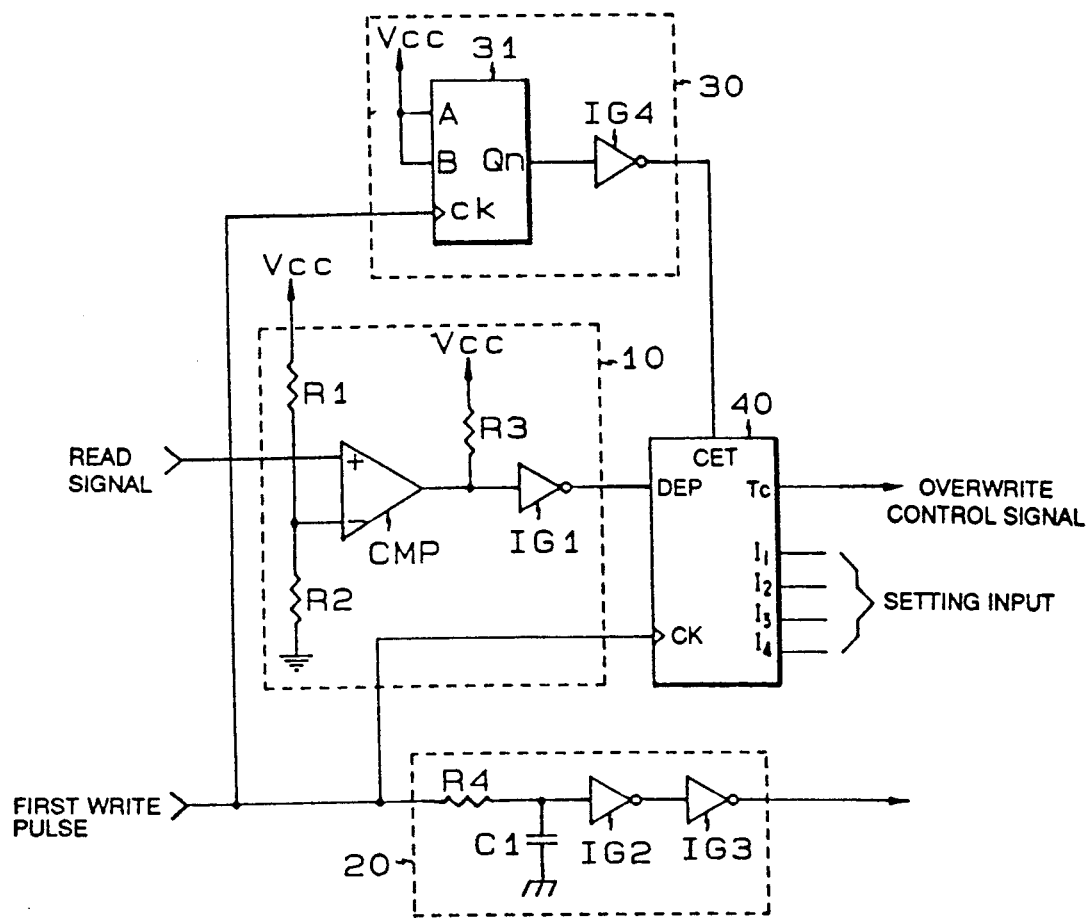
FIG. 3 is a schematic diagram illustrating a portion of the circuit of FIG. 2.

Referring to FIG. 3, the analog/digital converter 10 includes resistors $R_1$-$R_3$, comparator CMP and inverter $IG_1$. The delaying circuit 20 includes resistor $R_4$, capacitor $C_1$ and inverters $IG_2$-$IG_3$. Further, the time interval establishing circuit 30 includes a shift register 31 and an inverter $IG_4$.

Referring to FIG. 4, letting the value n of the time window interval and the set value of the counter be respectively 7 and 5, it is depicted that five error signals are produced from the beginning of the write pulse to seventh write pulse. The object of the present invention is to inhibit the overwriting by analyzing the disk state in a given time from the initial writing just before the write laser beam is emitted. To this end. according to the present invention, the first write pulse $d_1$ (modulated write pulse) is delayed for a given time to produce the second write pulse $d_2$, which causes the laser power controller 3 to emit the write beam. Meanwhile, just, before the write beam is emitted, the read beam is emitted, whereby the state of the signal read from the disk and the moment of the first write pulse generating are analyzed to determine whether the overwriting occurs.

If the signal read through the photo detector 1 and the pre-amplifier 2 as indicated in 4A of FIG. 4 is low state, it represents that data is previously written on the disk to form pits. The signal as indicated by 4A is applied to the non-inverting terminal of the comparator CMP, then compared with the reference signal applied to the inverting terminal of the comparator CMP, finally digitalized. The output of the comparator CMP is inverted through the inverter $IG_1$, converted into a digital signal as indicated by 4B. The first write pulse $d_1$ produced from the system control as indicated by 4C is delayed for the time constant determined by resistor $R_4$ and capacitor $C_1$, producing through the inverters $IG_2$-$IG_3$ the second write pulse $d_2$ of finite digital waveform 4D. The second write pulse $d_2$ causes the laser power controller 3 to work the laser diode 4 to produce the laser write beam.

Meanwhile, the first write pulse is applied to the clock terminal of the shift register 31, which works the counter 40 during a given time from the initial writing to establish the time window interval to detect the overwriting. The time window interval is determined by the output $Q_n$, and therefore the counter 40 is worked until n inputs of the first write pulse. Assuming the value of n is 7 (i.e., the time window interval is assumed to be the time interval from the initial writing to seventh of the first write pulses), the counter 40 analyzes the state of the read signal digitally converted as shown by 4B at the moment of the first write pulse as shown by 4C according to the output of the shift register 31 through the inverter $IG_4$ as shown by 4E. If the signal 4B is high state at the rising edge of the first write pulse, it represents the overwriting, which is counted by the counter 40 one by one. Counting the arbitrarily set value of the input terminals $I_1$-$I_4$ of the counter, the overwrite control signal 4F is generated.

As described above, the inventive circuit analyzes the signal read from the disk just before the write data is emitted from the WORM type optical disk driver, to produce the overwrite error signals when the pitted portion is overwritten, so that the system control receives the overwrite control signal and interrupts the writing operation signals, thus preventing data destruction.

While the invention has been particularly shown and described with reference to a preferred embodiment, it will be understood by those skilled in the art that modifications in detail may be made without departing from the spirit and scope of the invention.

What is claimed is:

1. A circuit for inhibiting overwriting for use in a write once read many optical disk driver, comprising:
    laser beam producing means for producing a data read beam for reading data from an optical disk and a data write beam for writing data to be stored on the optical disk;
    data reading means for producing analog read signals corresponding to data read by the data read beam;
    delaying means for delaying a first write pulse to produce a second write pulse for enabling the data write beam;
    an analog/digital converter for converting said analog read signals into digital signals;
    time interval establishing means for producing a time window signal representing a time interval for generating overwrite error signals during a predetermined period; and
    counting means for producing an overwrite control signal to inhibit said writing of data onto the optical disc when a numerical count value equals a predetermined number, said numerical count value being defined as a number of simultaneous occurrences of pulses of said digital signals and rising edges of said first write signals during said time window.

2. A circuit for inhibiting overwriting for use in a write once read many optical disk driver, comprising:
    laser producing means for producing a laser write beam for writing data to be stored on an optical disk and a laser read beam for reading said stored data;
    data reading means for producing a read signal representing said data read from the optical disk;
    time interval establishing means for producing a time window signal representing a time interval for generating overwrite error signals during a predetermined period; and
    counting means for producing an overwrite control signal to inhibit writing of said data onto the optical disc when a numerical count value equals a predetermined number, said numerical count value being defined as a number of simultaneous occurrences of pulses of said read signal with rising edges of first write signals during said time window.

3. The circuit of claim 2 further comprising:

delay means for producing second write signals by delaying first write signals by a predetermined delay period, said laser producing means receiving the second write signals for enabling the laser write beam.

4. A circuit for inhibiting overwriting of stored data on an optical disk comprising:

timing means for producing a time window of predetermined duration in response to a write signal; and counting means for producing an overwrite control signal to inhibit writing of data onto the optical disc when a numerical count value equals a predetermined number, said numerical count value being defined as a number of simultaneous occurrences of pulses of a read signal with rising edges of first write signals during said time window.

5. A method of inhibiting overwriting in a write once read many type optical disk driver, the method comprising the steps of:

reading data of an optical disk;

emitting a write pulse;

emitting a time window representative of a time interval;

detecting a concurrent occurrence of a rising edge of the write pulse with said data read from the optical disk during the time window; and write inhibiting the optical disk if the rising edge of the write pulse occurs concurrently with said data read from the optical disk during the time window.

6. A method of inhibiting overwriting in a write once read many type optical disk driver, the method comprising the steps of:

reading data of an optical disk;

emitting write pulses;

emitting a time window of a time interval;

detecting a concurrent occurrence of a rising edge of one of the write pulses with said data read from the optical disk during the time window;

counting a number of said concurrent occurrences detected in said detecting step during the time window by incrementing a count value by one for each said concurrent occurrence detected; and write inhibiting the optical disk if the count value equals a predetermined number during the time window.

* * * * *

UNITED STATES PATENT AND TRADEMARK OFFICE
CERTIFICATE OF CORRECTION

PATENT NO. : 5,233,593
DATED : August 3, 1993
INVENTOR(S) : Tae-Yong Ha It is certified that error appears in the above-identified patent and that said Letters Patent is hereby corrected as shown below:

On the Title Page, item [54]:

replace "METHOD OF HIGH SPEED SEARCHING FOR A DESIRED TAPE PORTION IN A DIGITAL AUDIO TAPE RECORDER"

with --CIRCUIT FOR INHIBITING OVERWRITING USED IN AN OPTICAL DISK DRIVER--;

Column 1,

Line 1, replace "METHOD OF HIGH SPEED SEARCHING FOR A DESIRED TAPE PORTION IN A DIGITAL AUDIO TAPE RECORDER", with --CIRCUIT FOR INHIBITING OVERWRITING USED IN AN OPTICAL DISK DRIVER--;

Line 21, after "disk" insert --,--;

UNITED STATES PATENT AND TRADEMARK OFFICE
CERTIFICATE OF CORRECTION

PATENT NO. : 5,233,593
DATED : August 3, 1993
INVENTOR(S) : Tae-Yong Ha

It is certified that error appears in the above-identified patent and that said Letters Patent is hereby corrected as shown below:

Line 22,    after "including", delete comma; and change "unstability" to --instability--;

Line 61,    change "shows" to --show--;

Line 67,    change "shows" to --show--;

Column 2,

Line 33,    change "errors" to --error--;

Line 63,    change "If data" to --If a data--;

Line 64,    after "represents", insert --that--;

Line 66,    change "is" to --will be--;

UNITED STATES PATENT AND TRADEMARK OFFICE
CERTIFICATE OF CORRECTION

PATENT NO. : 5,233,593
DATED : August 3, 1993
INVENTOR(S) : Tae-Yong Ha

It is certified that error appears in the above-indentified patent and that said Letters Patent is hereby corrected as shown below:

Column 3,

Line 11,    replace "they" with --overwriting error signals--;

Line 14,    change "unstability" to --instability--;

Column 4,

Line 16,    delete "signals";

Signed and Sealed this

Twenty-third Day of August, 1994

Attest:

BRUCE LEHMAN

Attesting Officer      Commissioner of Patents and Trademarks